(12) United States Patent
Pierce

(10) Patent No.: US 8,117,679 B2
(45) Date of Patent: Feb. 21, 2012

(54) MOLDED ARTICLES AND MOLDING METHODS PARTICULARLY FOR A PROTECTIVE HELMET

(75) Inventor: Brendan Erik Pierce, San Jose, CA (US)

(73) Assignee: Fox Head, Inc., Morgan Hill, CA (US)

( * ) Notice: Subject to any disclaimer, the term of this patent is extended or adjusted under 35 U.S.C. 154(b) by 1236 days.

(21) Appl. No.: 11/387,461

(22) Filed: Mar. 22, 2006

(65) Prior Publication Data

US 2007/0220662 A1    Sep. 27, 2007

(51) Int. Cl.
    *A42B 1/08* (2006.01)
(52) U.S. Cl. .................................. 2/424; 2/410
(58) Field of Classification Search .............. 2/410, 422, 2/411–412, 424–425
    See application file for complete search history.

(56) References Cited

U.S. PATENT DOCUMENTS

| | | | |
|---|---|---|---|
| 3,818,508 A * | 6/1974 | Lammers et al. .................. | 2/412 |
| 4,038,700 A | 8/1977 | Gyory | |
| 4,280,491 A * | 7/1981 | Berg et al. ................ | 128/201.24 |
| 4,502,480 A * | 3/1985 | Yamamoto ............... | 128/201.15 |
| 4,514,864 A | 5/1985 | Huber | |
| 4,555,816 A | 12/1985 | Broersma | |
| H902 H * | 4/1991 | Rousseau ........................... | 2/414 |
| 5,050,240 A | 9/1991 | Sayre | |
| 5,086,520 A | 2/1992 | Arai | |
| 5,217,555 A | 6/1993 | Franklin, III et al. | |
| 5,298,208 A | 3/1994 | Sibley et al. | |
| 5,309,576 A | 5/1994 | Broersma | |
| 5,337,421 A | 8/1994 | Jeng | |
| 5,345,614 A | 9/1994 | Tanaka | |
| 5,598,588 A | 2/1997 | Lee | |
| 5,609,802 A | 3/1997 | Jeng | |
| 5,699,561 A | 12/1997 | Broersma | |
| 5,853,651 A | 12/1998 | Lindsay et al. | |
| 6,247,186 B1 | 6/2001 | Huang | |
| 6,263,513 B1 | 7/2001 | Murakami | |
| 6,317,891 B1 | 11/2001 | Gafforio | |
| 6,361,840 B2 | 3/2002 | Nelson et al. | |
| 6,363,539 B2 | 4/2002 | Tachi et al. | |

(Continued)

FOREIGN PATENT DOCUMENTS

DE    004305745    9/1994

(Continued)

OTHER PUBLICATIONS

Australian Examination Report dated May 5, 2009, for corresponding Australian Patent Application No. 2007201193; 1 page.

(Continued)

*Primary Examiner* — Shaun R Hurley
*Assistant Examiner* — Andrew Sutton
(74) *Attorney, Agent, or Firm* — Ganz Law, PC

(57) ABSTRACT

Protective structures, such as helmets, may have a shell including an outer shell and a tunnel element integral to the outer shell. The tunnel element may have a first opening at an outer surface side of the shell and a second opening at an inner surface side of the shell so that air flow may occur between the openings and wherein the tunnel element is fused to the outer shell. An impact liner may be directly in-molded to shells suitable for use in motorcycle helmets and other helmets that must meet certain standards. The impact liner may include one or more venting channels that are coupled to a tunnel integral to the shell structure.

24 Claims, 10 Drawing Sheets

U.S. PATENT DOCUMENTS

| | | |
|---|---|---|
| 6,381,759 B1 | 5/2002 | Katz |
| 6,425,143 B1 | 7/2002 | Benedict et al. |
| 6,604,246 B1 | 8/2003 | Obreja |
| 6,763,526 B1 | 7/2004 | Hong |
| 6,810,532 B2 | 11/2004 | Wang Lee |
| 6,925,657 B2 * | 8/2005 | Takahashi et al. ............ 2/412 |
| 6,954,944 B2 * | 10/2005 | Feher ........................ 2/171.3 |
| D526,092 S | 8/2006 | Egger et al. |
| 2004/0064873 A1 | 4/2004 | Muskovitz |
| 2004/0070108 A1 | 4/2004 | Simpson et al. |
| 2004/0188882 A1 | 9/2004 | Matsumoto et al. |
| 2004/0217521 A1 | 11/2004 | DiBattista et al. |
| 2005/0112304 A1 | 5/2005 | Hsu |
| 2005/0278833 A1 | 12/2005 | Pierce |
| 2005/0283885 A1 | 12/2005 | Stroud et al. |
| 2006/0031978 A1 | 2/2006 | Pierce |
| 2008/0134415 A1 | 6/2008 | Pierce |

FOREIGN PATENT DOCUMENTS

| | | |
|---|---|---|
| DE | 19504022 A1 | 8/1995 |
| DE | 19935389 | 2/2001 |
| EP | 0517091 | 12/1992 |
| EP | 0954992 A | 11/1999 |
| FR | 2557437 A | 7/1985 |
| JP | 10-130939 | 5/1998 |
| JP | 10331020 A | 12/1998 |
| JP | 2000328343 A | 11/2000 |
| WO | WO2004062409 A1 | 7/2004 |
| WO | WO 2005/000059 A1 | 1/2005 |

OTHER PUBLICATIONS

European Office Action for European Patent Application No. 07005944.9 dated Oct. 1, 2009, 5 pages.
Partial European Search Report dated Jul. 23, 2008.
www.bhsi.org/molded.htm; Bicycle Helmet Safety Institute; Molded in the shell helmets, 4 pages; last revised Jun. 14, 2005.
Canadian Office Action dated Apr. 1, 2009 for corresponding Canadian Application No. 2,582,746, 3 pages.
30 Years of Maximum Motocross—1974-2004—Fox—Product Catalog; Copyright 2003; Fox Racing, Inc. Morgan Hill, California; pp. 7, 9, 11, 12, 13, and 77 (7 pages total).
Fox MX Spring Additions 2005—Product Catalog; Copyright 2005; Fox Racing, Inc. Morgan Hill, California; pp. 9-15 (5 pages total).
Fox 2006—Product Catalog; Copyright 2005; Fox Racing, Inc. Morgan Hill, California; pp. 6-7, 46-48, and 84 (7 pages total).
European Search Report dated Nov. 3, 2008 for corresponding European patent application No. 07005944.9, filed Mar. 22, 2007 (11 pages total).
Australian examination report dated Nov. 20, 2008 for corresponding Australian patent application No. 2007201193, filed Mar. 20, 2007; 2 pages total.
Canadian Office action dated Feb. 17, 2010 for corresponding Canadian patent application No. 2,582,746; 3 pages.
Communication under Rule 71(3) EPC (Intent to grant) for corresponding European application No. 07 00 944.9-1256 (dated Aug. 2, 2010) (38 pages).

* cited by examiner

MOLDED ARTICLES AND MOLDING METHODS PARTICULARLY FOR A PROTECTIVE HELMET

BACKGROUND

The inventive subject matter disclosed herein generally relates to molded articles and methods relating to protective equipment. The molding and manufacturing techniques are particularly suitable for use in the manufacturing of a protective helmet structure for motor sports, including street and off-road motorcycling (including motocross), and human powered or gravity sports, such as bicycling and skiing. In the following description, a motorcycle helmet is used as a representative example of a product of the molding methods according to the inventive subject matter disclosed herein.

Modern motorcycle helmets have two principal protective components: (1) an outer shell made of a thin, hard material and (2) an inner liner of an impact absorbing material. The shell is typically formed of one or more layers of composite or moldable polymer materials based on carbon fiber, fiber glass, aramid fibers (e.g., Kevlar), polycarbonate, and/or acrylonitrile butadiene styrene (ABS) plastic, as well as combinations of the foregoing. The outer shell serves to help prevent penetration of the helmet by a pointed object that might otherwise puncture the skull, to spread the force of impact, and to provide structure to the inner impact liner so it does not disintegrate upon abrasive contact with pavement or objects. The impact liner attenuates impact forces by crushing or compressing. Not only must helmets be safe, but consumers also are looking for lighter weight and better ventilated helmets, among other things.

Conventional helmet shells may be manufactured using a molding process that may be referred to as the "Pressure Bladder" molding technique. The Pressure Bladder molding technique involves layering sheets of a composite onto an inflatable bladder that is the male portion of a male-female mold. The composite sheets may be "prepreg" sheets having an impregnated resin or they may be composite sheets that become treated with a resin in a wet lay-up on the inflatable bladder. The inflatable bladder with the composite sheets is placed into a female mold, and the mold is closed forming a seal. Heat is introduced into the mold to activate the resin, and the bladder is inflated with sufficient pressure to force the composite sheet material into the shape of the mold, which corresponds to the shape of the outer shell.

In the prior art, impact liners have been formed in an injection molding process separate from shells and then pressed into the shells for motorcycle helmets. The pressing process is usually performed by hand and it necessitates that the shell be designed somewhat larger than is ideal so that the liner, which has a larger topside than bottom side, can more easily fit into the cavity of the shell, which also has a small bottom side opening relative to the topside. This relationship in a helmet between the topside and bottom side corresponds to the anatomy of wearer's head and is known as "undercutting". The larger size increases the weight of the shell. Glue or tape may be used to secure the liner in place. Additionally, it would be more advantageous to structurally fuse the liner with the shell, which should result in a stronger helmet.

Another problem with conventional helmets is that the impact liners, such as EPS foam and similar material are highly thermally insulating, like a Styrofoam cup, which may cause the wearer to suffer discomfort during use. An overheated wearer is not only uncomfortable but may also be impeded from performing optimally during motor sport and athletic competitions. There may even be a risk of dehydration or dangerous lapses of attention resulting from the overheating, especially in certain sports, such as motocross, which may be held in hot climates. Accordingly, a substantial need exists for helmets that do not promote overheating. Unfortunately, dictating against the use of alternative materials to current foams are the substantial advantages that foam has on impact absorption. Foams are also lightweight, which is another factor that is important to wearers and which relates to comfort and performance.

There have been various attempts to improve helmets so that they are less prone to over-heating. Vents have been provided in helmet shells. The vents have an opening in the shell that leads to vent channels formed in the impact liner material, which is typically EPS, or between sections of the liner material. The channels deliver air to the interior area of the helmet, thereby exposing the wearer's head to the air. One of the problems with conventional vents is that the channels must be carefully engineered so that the helmet's ability to absorb impacts is not compromised by the changes in structure. Consequently, there are limitations to how large the channels can be and how they can be routed to deliver air. Another problem is that conventional vent structures formed in a combination of outer shell and impact materials, such as EPS, may result in a gap or rough interface between the opening of the shell and the pressed-in impact liner that is not conducive to good air flow into the helmet, or at least requires extra finishing steps.

In view of the foregoing, there is a substantial need for improved helmets that are stronger and safer, lighter, cooler and more comfortable to use. Some progress has been made at addressing some of the aforementioned problems. See, for example, U.S. Publication Numbers 20050278833 and 20060031978, and U.S. Design Application No. 29/218,313, co-owned with this application, disclose generally a motorcycle helmet and various components. More particularly, a ventilation system is disclosed in co-owned U.S. Ser. No. 11/434,304, filed May 15, 2006; entitled Low Profile Helmet Vents and Venting Systems. These patent applications are hereby incorporated by reference as if set forth herein in their entireties. However, notwithstanding such progress, there is an ever present need for improvements.

SUMMARY

In certain respects, the inventive subject matter disclosed herein provides novel and advantageous methods for direct molding of an impact liner (or portion thereof) to an outer shell (or portion thereof) for a protective helmet, such as a motorcycle helmet, mountain biking helmet, and downhill skiing helmet. The helmet may be of any style, including full-face and skull cap helmets. The direct molding eliminates the need for extra production steps such as the separate formation of the liner and the manual pressing of the liner into the shell, which also entails a risk of possible damage to the liner and its ability to perform. Consequently, production time speeds-up. Advantageously, an in-molding of the liner also means that the shell need not be formed larger to accommodate the pressing operation, saving shell weight plus the weight of incidental materials used in the pressing, such as tapes. Air gaps between the shell and impact liner can also be eliminated or reduced for better safety testing and use.

In certain other respects, the inventive subject matter disclosed herein addresses the problems in the prior art by providing a method for forming larger and more efficient ventilation tunnels and channels in a helmet. The tunnels may also enhance the protective nature of the shell by forming a unitary structure with the outer shell that is double walled along tunnel regions. The double walling of the tunnel provides additional reinforcement zones that may help better withstand spiking in safety testing and use. In contrast, the vents in conventional helmets are simply openings that lead into venting channels formed in the relative soft impact liner. Aesthetically, the tunnels disclosed herein can produce cleaner vent openings in the shell of a helmet. Still further, the inventive methods should reduce venting formation steps and can save costs associated with the removed steps.

In certain other respects, the inventive subject matter uses a novel combination of processes to produce advantageous new helmets and components thereof wherein one or more internal venting air tunnels are formed in or integral to the outer shell. An impact liner, such as EPS, may be directly in-molded to the shell. The impact liner may include one or more venting channels that are coupled to a tunnel integral to the shell structure.

Among the embodiments according to the inventive subject matter is a shell for a protective helmet comprising a shell and tunnel element integral to the shell, the tunnel element having a first opening at an outer surface side of the shell and a second opening at an inner surface side of the shell so that air flow may occur between the openings. The shell may have a tunnel that is made integral to the shell through a pressure bladder molding of the tunnel element to shell material. Alternatively, the shell may be made integral to the tunnel by chemically bonding a preformed tunnel element to a portion of the shell. The shell may comprise a molded lay-up of composite material. At least some of the composite materials may include prepreg materials. An impact liner may be disposed in the interior of the shell. The impact liner may comprise a moldable, compressible, impact attenuating polymer material. The impact liner may be in-molded to the shell. A tunnel may be coupled to at least one channel formed in the impact liner. The tunnel may comprise a molded composite lay-up. The impact liner may comprise EPS or EPP. The impact absorbing liner may be connected to the shell and the tubular element may extend into the impact liner directly or through channels provided therein. The impact liner may comprise multiple layers or zones of different moldable, compressible impact attenuating polymer material. The impact liner may comprise multiple layers or zones of different densities of moldable, compressible impact attenuating polymer material. The shell may comprise at least one of carbon fiber, aramid fiber (e.g., Kevlar), fiberglass, polycarbonate, and ABS. A tunnel may typically have a volume of at least approximately 1.0 cubic inch. A helmet as described herein may be designed to meet US DOT Standard 218. A tunnel may include a constriction for providing a Venturi effect. A tunnel may include a fan for directing the airflow. A tunnel may include an adjustable means for regulating airflow in the tunnel.

In another embodiment, the inventive subject matter disclosed herein is directed to a protective element for a person comprising: a hard outer layer of at least one of carbon fiber, aramid fiber (e.g., Kevlar), fiberglass, polycarbonate, and ABS composite; and a tunnel element integral to the outer layer, the tunnel element having a first opening at an outer surface side of the protective element and a second opening at an inner surface side of the protective element so that airflow may be occur between the openings.

The inventive subject matter disclosed here also is directed to methods of making a shell for a protective helmet comprising providing a shell and forming a tunnel element integral to the shell, the tunnel element having a first opening at an outer surface side of the shell and a second opening at an inner surface side of the shell so that air flow may occur between the openings. Another method according to the inventive subject matter is directed to making a motorcycle helmet comprising providing a shell and in-molding impact liner material directly to the shell to form an impact liner. Another method according to the inventive subject matter is directed to making a protective element for a person comprising: forming a hard outer layer of at least one of carbon fiber, aramid fiber (e.g., Kevlar), fiberglass, polycarbonate, and ABS composite; and forming a tunnel element integral to the hard outer layer, the tunnel element having a first opening at an outer surface side of the protective element and a second opening at an inner surface side of the protective element so that airflow may occur between the openings. In the methods a shell and tunnel may be co-molded. The tunnel may be formed in a separate molding process from the shell and then made integral to the shell. A pressure bladder technique may be used to form at least one of the shell and tunnel. The forming may comprise providing a lay-up of composite material on a mold. At least some of the composite materials may include prepreg materials. The methods also contemplate forming an impact liner in the shell, the impact liner comprising a moldable, compressible, impact attenuating polymer material. The forming of the impact liner may comprise in-molding an impact liner material directly to the shell. In the methods the impact liner material may comprise EPS or EPP. In the methods the in-molding may comprise forming multiple layers or zones of different moldable, compressible impact attenuating polymer material. In the methods the in-molding may comprise forming multiple layers or zones of different densities of moldable, compressible impact attenuating polymer material. In the methods the shell may comprise at least one of carbon fiber, aramid fiber (e.g., Kevlar), fiberglass, polycarbonate, and ABS. In the methods an integral tunnel to the shell is formed wherein the tunnel material comprises at least one of carbon fiber, aramid fiber (e.g., Kevlar), fiberglass, polycarbonate, and ABS. In the methods, the tunnel has a volume of at least approximately 1.0 cubic inch.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

FIG. 8B is a section of the male-female mold assembly with the composite lay-up fitted there between.

DETAILED DESCRIPTION

Figure 1:
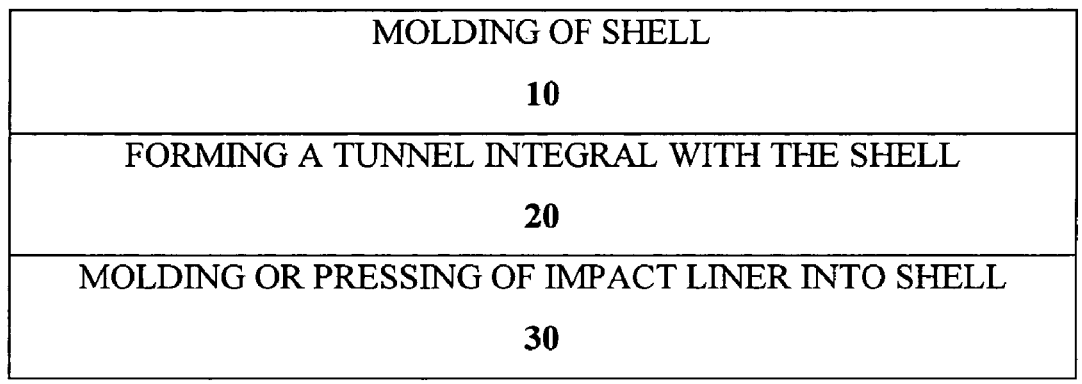
FIG. 1 shows a flow chart of steps that may be used in certain embodiments according to the inventive subject matter.

Representative embodiments of the present invention are shown in FIGS. 1-16B, wherein similar features share common reference numerals.

FIG. 1 shows a flowchart listing steps relating to the formation of a venting tunnel that is integral to an outer shell for a protective helmet, according to the inventive subject matter. In step 10 a shell for a helmet 12 is formed using a shell molding technique, such as pressure bladder or injection molding. In step 20, a tunnel 22 is formed in or on the shell at the same time as the shell is formed. Alternatively, the tunnel 22 may be formed in a separate step that occurs before or after the molding of the shell. For example, it may be a tubular element or open-sided element that forms a tunnel when mated to the surface of a shell. If the element is formed separately from the shell, it may be bonded to the shell by any number of known bonding means. For example, the bonding means may be a co-molding process where the tunnel is preformed placed in the composite lay-up. A pre-formed tunnel structure, formed as a composite or injection molded structure, for example, may also be bonded to the shell by chemical adhesives, fusion, such as welding, or taping (e.g., high strength, double-sided tape). In step 30, an impact-absorbing liner 32 is formed in the shell. Hereafter a tunnel that is co-molded to the shell or chemically bonded or otherwise fused to the shell may be referred to being integral to the shell or forming a unitary structure with the shell. As used herein "tunnel" means a pipe, pipe-like, tubular, or tube-like element of any uniform or varying cross-sectional configuration or configurations capable of conveying a stream of fluid, such as air, from one opening in a tunnel structure to another spaced apart opening, even if there is some loss of fluid along the path. For example, a tube having some perforations, slits, or other openness in its wall would still be within the definition of "tunnel" if a substantial stream of fluid could still be transported from one end to another. The following describes in more detail the production of a helmet according to the foregoing steps.

Figure 2:
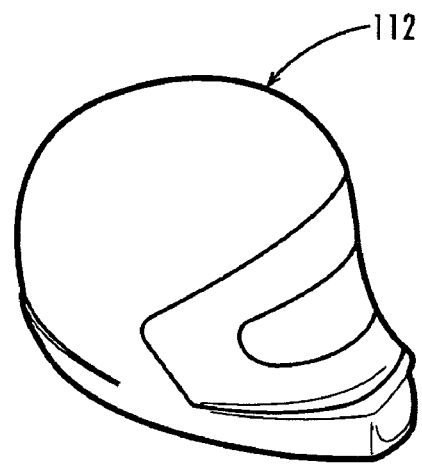
FIG. 2 shows an inflatable bladder that may serve as a male mold for a composite lay-up according to the inventive subject matter.

FIG. 2 shows an inflatable bladder 112 that is the male component of a male-female mold. The bladder usually represents the shape of a finished helmet shell and composite material is laid over it in forming the shell. While a full helmet shell is represented in FIG. 2, the inventive subject matter contemplates bladders that represent only portions of a helmet, which may then be used to form a multi-piece helmet. For example, an upper shell and chin piece components may be formed in separate processes and combined together to form a finished helmet. Similarly, while a full-face helmet is shown, helmet shells that provide less than full face coverage are within the scope of the inventive subject matter. The bladder 112 may be formed of rubber or other inflatable materials known as suitable for pressure bladder molding. As already noted, the pressure bladder is a male component of male-female pressure bladder molding tooling. The female component is a cavity that has a complementary shape to that of the finished helmet shell and be sized to receive the inflatable bladder plus the laid-up composite material that ultimately forms the helmet shell. The inventive subject matter also contemplates that the pressure bladder molding may invert the roles of the female and male molds. In other words, the inflatable bladder shown in FIG. 2 could instead be a male core mold onto which a composite lay-up is placed, and the female mold could include an inflatable material that inflates to press the lay-up against the core mold, and in combination with heat, cures and sets the lay-up in to the final shape of the shell. The core mold could be made collapsible so that it can be removed from the cavity of the shell. The making of collapsible molds is well-known in the art. They can, for example, be based on two or more metal pieces that form a unit during molding but which can be separated into individual pieces (or collapsed one within another) for insertion into or removal from spaces or openings that are smaller than the assembled unit. The assembly of pieces comprising the core may be manipulated by hand or pneumatics, for instance.

Shells made in whole or part of injection molded polymer materials are also contemplated by the inventive subject matter. Tunnels may be formed in injection molded shells by providing a tubular form in the mold so that the injected shell material forms a tunnel around the form that is integral to the shell. The tunnel may also be formed using a composite lay-up molding in a relief, as described above, or pre-formed injection molded tubular structure, for example. Shell material is then injected over the tubular composite lay-up or structure to form an integral shell-tunnel structure. Another, alternative is to form the injection molded shell and tunnel in separate steps and then bond the two together, as described above.

A significant amount of detail can be molded into a product using a tubular bladder pressure technique. US Patent Publication No. 20040188882 is representative of the technology of molding tubular members from composite materials, and is hereby incorporated by reference in its entirety for all its disclosure. Typically, the tubular bladder is a thin, tube-shaped pressure-resistant nylon air bladder. Composite material is loosely laid over a tube-shaped bladder. A support structure may also be provided in the tube to help support the piece that is removed from the bladder prior to molding. The piece is placed into a mold, and the mold is then closed leaving both ends of the tube bladder outside the mold. One end is clamped tight, while the other end is attached to a pressurized air source. The mold is heated, the bladder inflated, and the composite material is heated and pushed into the mold by the inflated bladder. The resin is activated and begins to cure, and the piece is finished. The whole process typically takes approximately 20 minutes. A novel and advantageous application of the technique not previously recognized or suggested is as follows.

Figure 3:
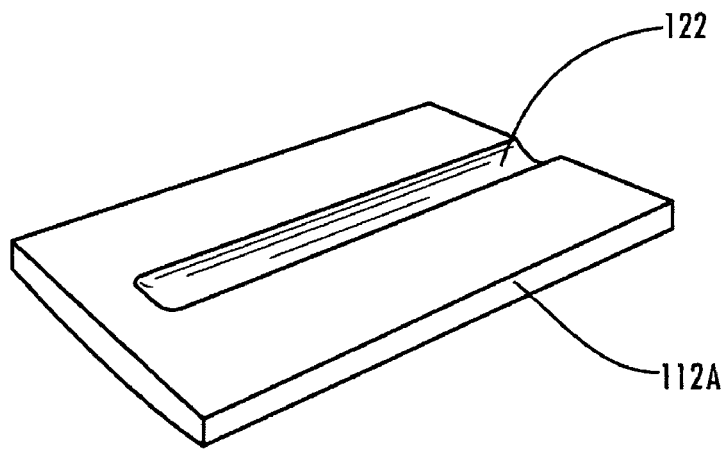
FIG. 3 represents a surface section of the inflatable bladder of FIG. 2.

FIG. 3 represents an exterior section 112A of the pressure bladder of FIG. 2. It shows details of a relief 122 for creating a tunnel 22 in the shell. In this example, the tunnel will protrude from the surface of the shell in a forehead area of the shell. However, the tunnel may also be formed above or below the general surface of the shell and have an open end at or through the surface. The tunnel may be formed in any forward, side or rear region of the shell. It may also be formed off the main shell in a chin guard. In some applications the tunnel is located so that it intakes air. In a typical application, the air is forced into a tunnel by virtue of the motion of a wearer. Additionally, the tunnel may be located at a rear portion of the shell to exhaust air from the helmet. Such an exhaust tunnel may be directly or indirectly coupled to a tunnel on a forward portion of a shell. It is also contemplated that the tunnel may house an electric fan unit that directs air into or out of the helmet. A power source for the fan could be a battery or even a solar power cell molded or otherwise integrated into the surface of the outer shell. Tunnels according to the inventive subject matter may also be associated with mechanical features that allow for control of air flow, such as adjustable shutters or other flow restriction means. There may also be connectors to the tunnel that extend the tunnel to inner or outer parts of the shell or provide an aesthetic look at vent openings in the outer or inner surface of a helmet.

Figure 4:
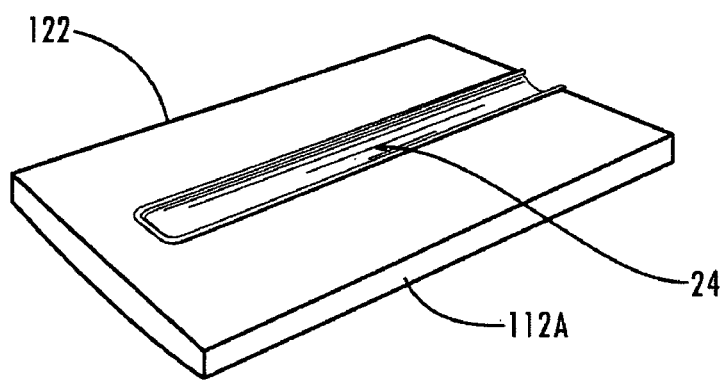
FIG. 4 represents the surface section of FIG. 3 with material to be molded in-laid within a relief in the surface.

For ease of production, the tunnel for a composite outer shell preferably is formed using the same or similar composite materials used to form the shell, and, like the shell, is rigid. The tunnel structures may have varying lengths. In certain embodiments the opening of the tunnel is disposed on a frontal portion of a helmet where there is most wind exposure and leads to an interior portion of the helmet towards the middle of the head at the top or sides, where ventilation may be most needed. Accordingly, a tunnel structure that is suitable for delivering air from a location of high windage to a location of high cooling demand typically may be from about 1" to about 12" inches long, depending on the location in the helmet where air is to be delivered. To ensure good flow through the helmet, the average internal diameter of the tunnel should typically be at least about ¼ inches. (If the tunnel is not circular in cross section, the average cross-sectional area should be about the same as that of a circle with the foregoing diameter.) FIG. 4 represents one or more layers of a moldable material 24 for forming an inner layer of the tunnel 22 laid into relief 122. The relief defines the shape of the tunnel to be formed in the shell 12. A suitable moldable tunnel material 24 is a composite material. The composite may be formed using a "prepreg" composite material. Prepreg composite materials are typically mats, continuous fibers, fabrics, nonwoven materials or roving materials that are pre-impregnated with a thermoset or thermoplastic organic resin matrices that is partially cured and ready for molding. Alternatively, the tunnel, as well as the outer shell, may be formed using composites that are not pre-impregnated by a standard wet lay-up technique, which is well known to persons skilled in the art. Part of the outer shell material may also be laid out as well at this time so that it overlaps the tunnel material in the relief 122 and ties it to the general shell structure. Suitable resins may be based on polyester, polyurethane, epoxy, polybutylene, polyamide, or vinyl ester. The resins may be cured via heating and/or exposure to an activating wavelength of light, which usually is in the UV range.

Figure 5:
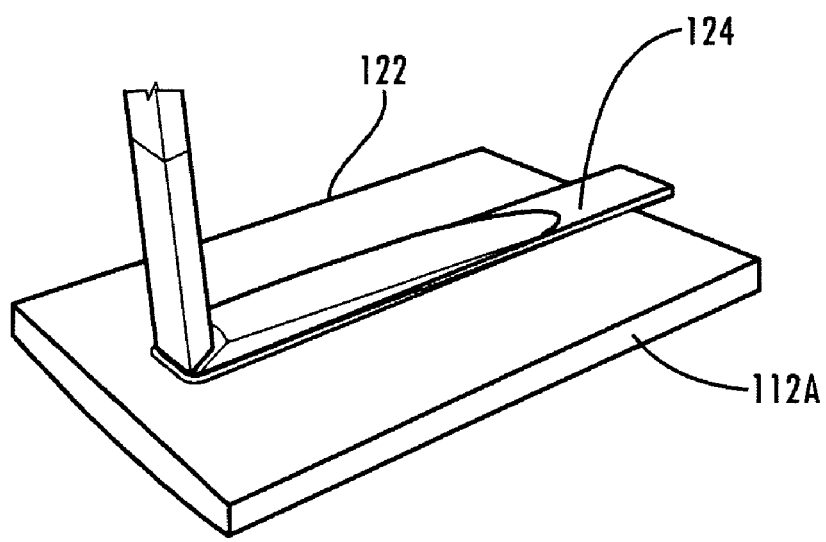
FIG. 5 represents an inflatable tubular bladder laid over the material and relief of FIG. 4.

In FIG. 5, a tubular inflatable bladder 124 is placed into the tunnel relief 122 over the composite materials. The tubular bladder is generally intended to match the shape of a desired tunnel. Although the tunnel that will form in relief 122 will have a generally elongate hollow structure with opposing open ends, the inventive subject contemplates that the tunnel may have branches, for example a "Y" shape, that takes air in from a central opening in the outer shell and directs it to two or more other openings venting into the helmet. Further, any given shell may have a plurality of tunnels at desired locations. The size and shape of the tunnels, and how many and where they are located around a shell, are matters of design choice, depending on desired air flow, ventilation zones, and/or aesthetic effects, for example.

Figure 6:
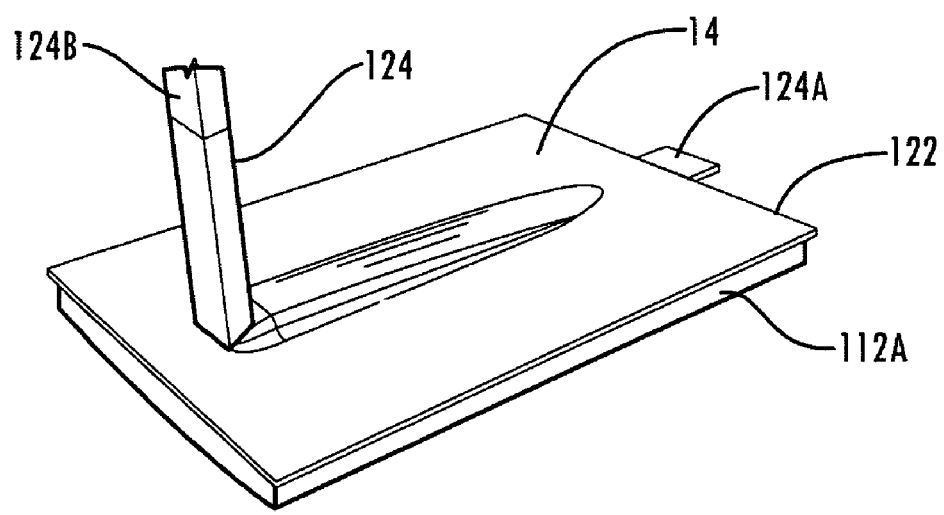
FIG. 6 shows further material for molding laid over the inflatable bladder and surface of FIG. 5.
Figure 7A:
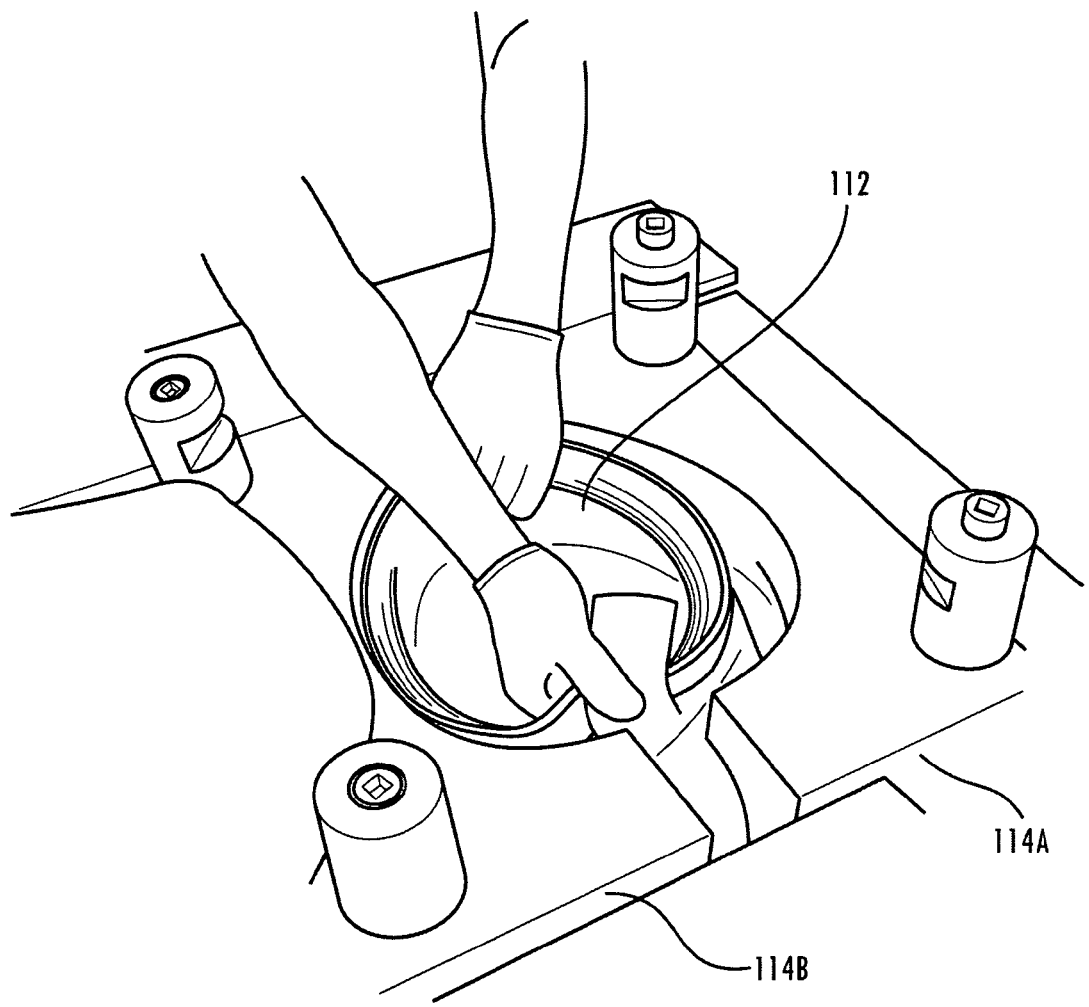
FIG. 7A shows a two-halved female mold component for use in a molding procedure according to the inventive subject matter.
Figure 7B:
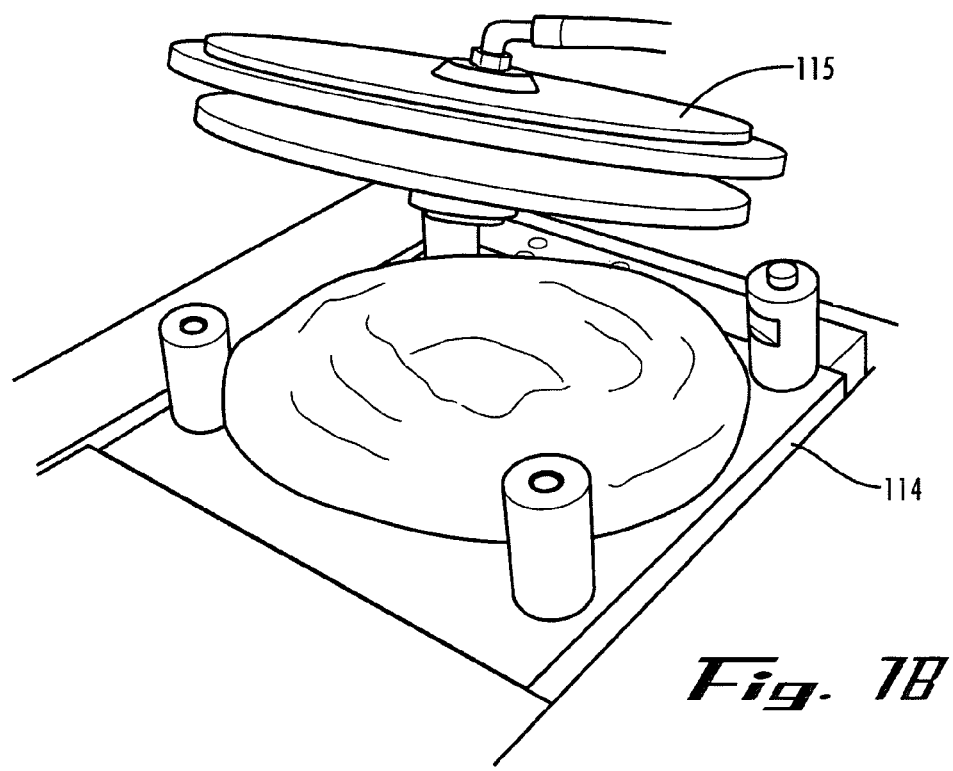
FIG. 7B shows the top of the mold of FIG. 7A with the inflatable bladder and composite lay-up fitted therein.
Figure 8A:
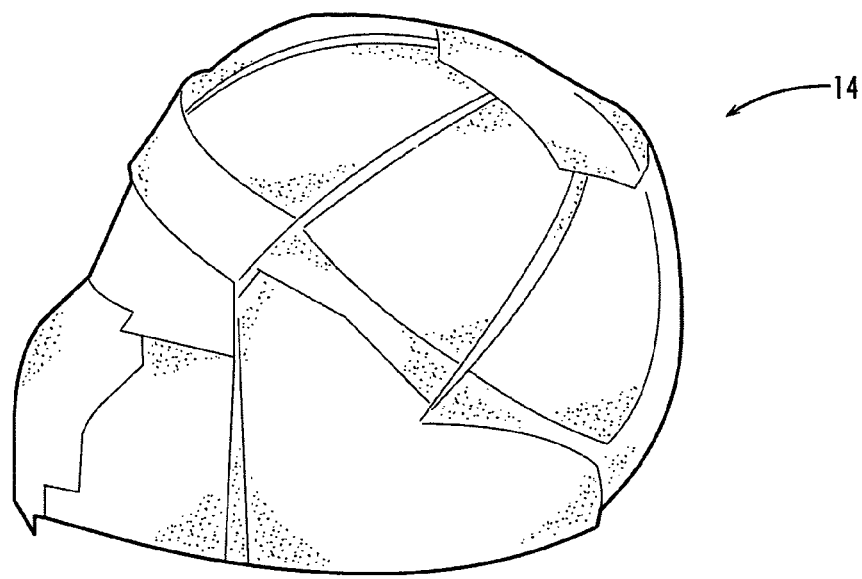
FIG. 8A shows the inflatable bladder of FIG. 2 with a composite lay-up.
Figure 8B:
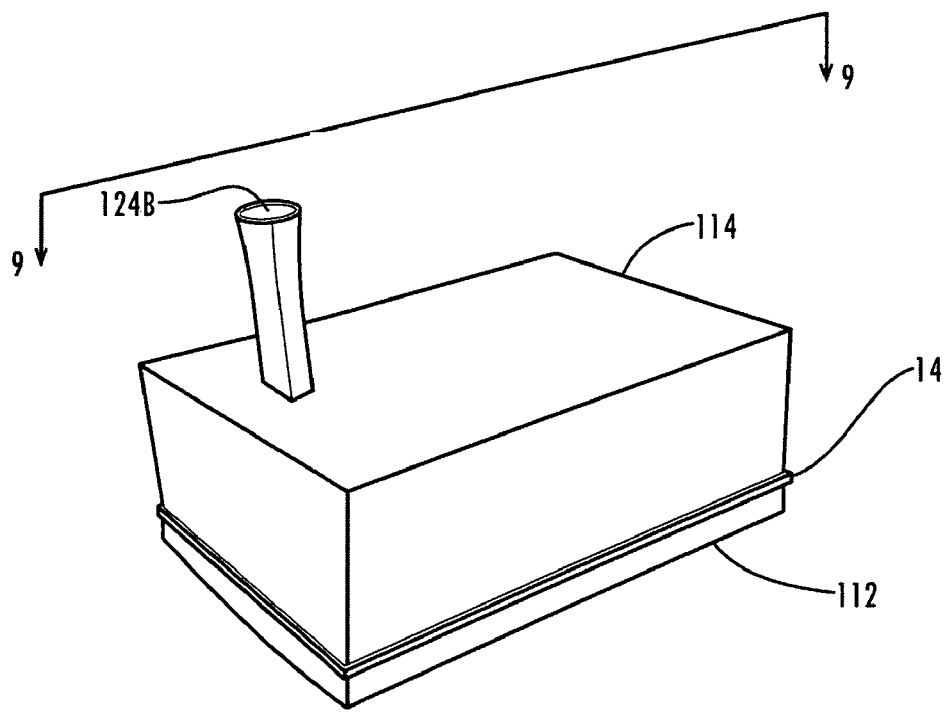

FIG. 6 represents the main outer shell prepreg composite material 14 placed around the air bladder 112 and over the tubular bladder 124 in relief 122. This forms the outer shell structure 12. It will be appreciated by persons skilled in the art that the composite material 14 is a lay-up that can be based on any number of layers of composite materials and any kind of composite. Motorcycle helmets formed with composite shells typically have two to ten layers of composite materials, the layering being greater where more protection is needed. For example, a chin piece may have only 2 layers, while a side of the helmet may have 10 layers. One or more of carbon fiber, aramid fiber (e.g., Kevlar), fiberglass, polycarbonate, and ABS composite or injection molded polymer layers may be used in forming a shell. A typical composite or polymer shell is from about 0.08 inches to 0.20 inches thick and the thickness may vary according to where protection is most needed. The composites may have unidirectional or bidirectional fibers. The fibers in a given layer may be angled relative to those in an adjacent layer to impart strength. It is well within the person skilled in the art to determine the appropriate selection and arrangement of composite materials and layering for helmet applications, so further detail is not provided herein. Optionally, strips of honeycomb material and/or other types of structural material (not shown) may be incorporated in the composite lay-up that is disposed on air bladder 112. Honeycomb and other geometrical structures can provide force attenuation based on their ability to compress or crush under force. These materials can therefore supplement the impact liner to absorb impact forces and are incorporated directly in the shell.

A scrim composite material layer may also be placed on the lay-up (FIG. 8A) as the outermost layer of the shell. The scrim layer is typically fiberglass that can be sanded for cosmetic finishing. The scrim layer protects underlying layers whose functional integrity could be jeopardized by finishing treatments such as sanding or painting.

Looking further at FIG. 6, tubular bladder 124 has a first end 124A that is closed and a second end 124B that is open. Open end 124B can be coupled to a pressure source for pressurizing the tubular bladder. For this purpose, second end 124B extends out and away from the surface 122 of the shell composite 122. Any metal or plastic anchors (such as visor screw bosses or chin-strap hangers) may be inserted into the composite lay up at this time.

Figure 9:
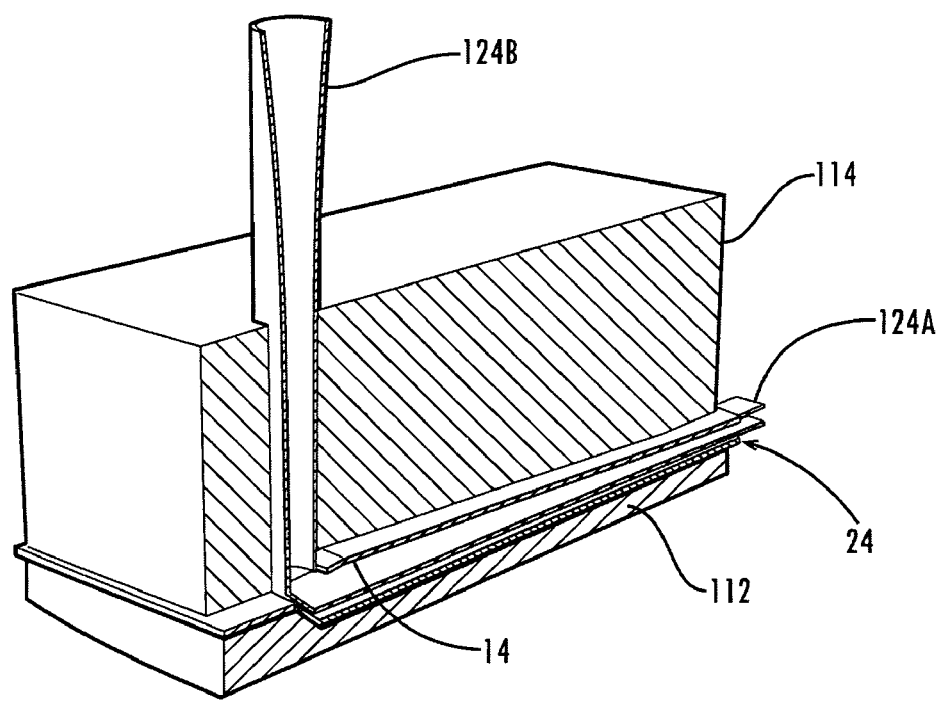
FIG. 9 shows a cross-section of the assembly of FIG. 8B taken along line 9-9.
Figure 10:
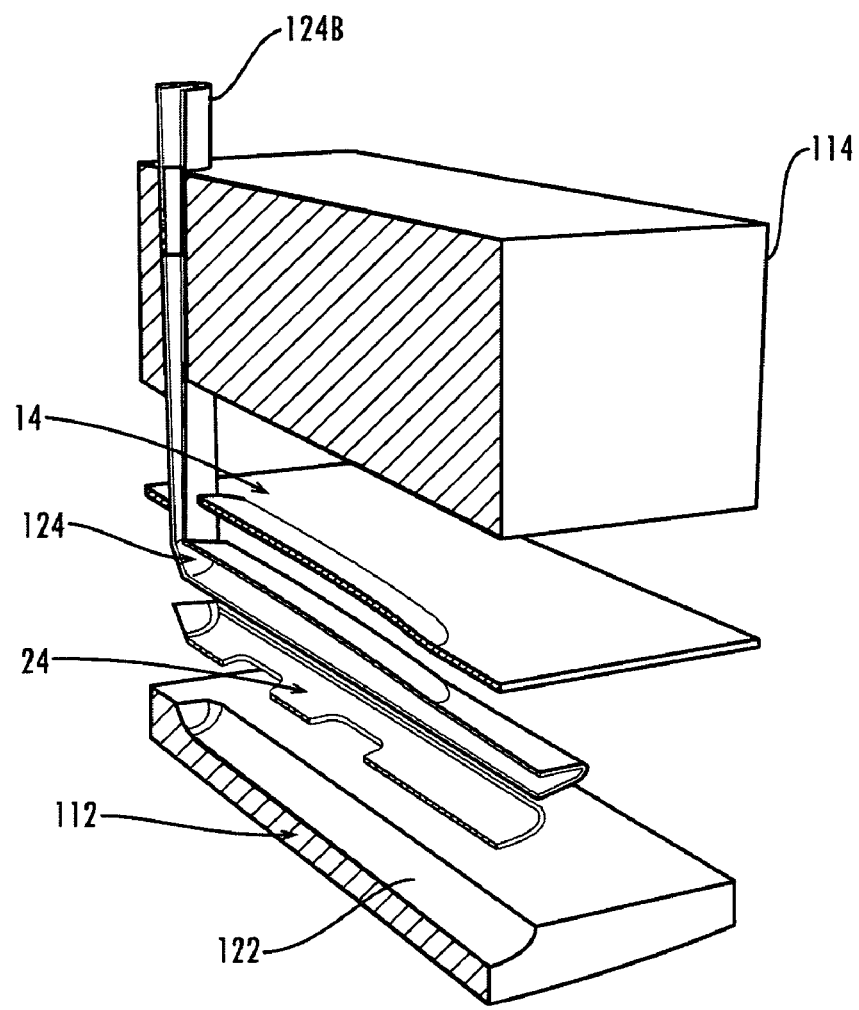
FIG. 10 is an exploded view of the assembly of FIG. 9.
Figure 11A:
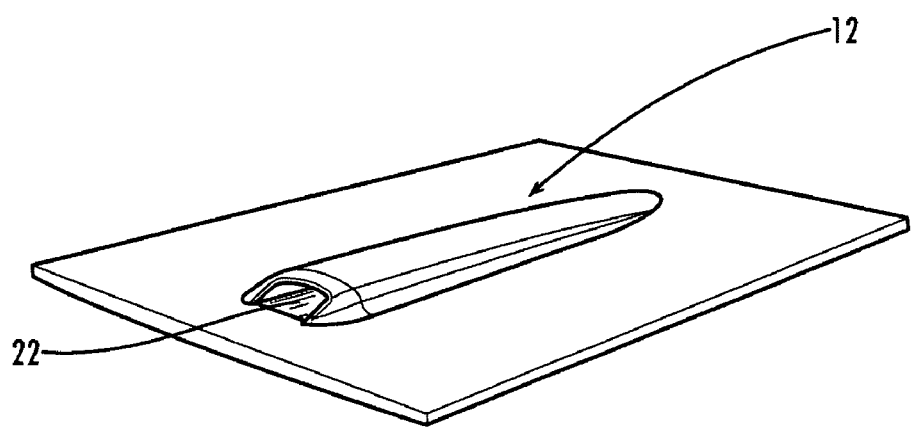
FIG. 11A is a top perspective view of a section of a molded shell component with integral tunnel according to the inventive subject matter.
Figure 11B:
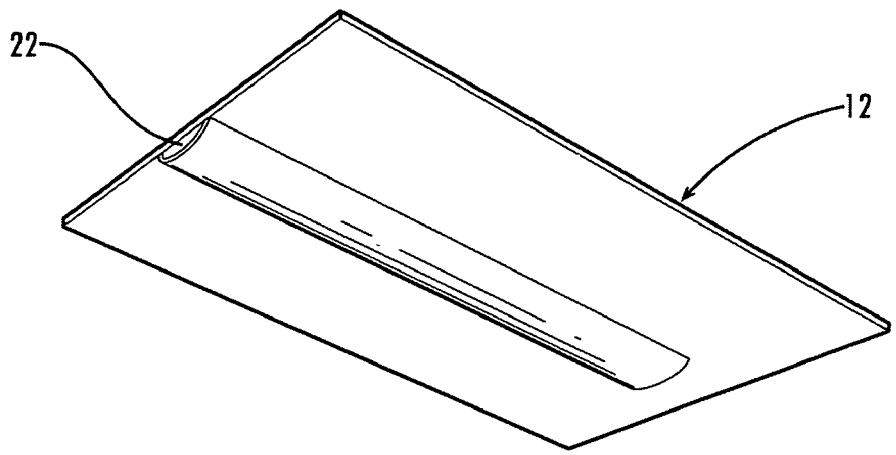
FIG. 11B is a bottom perspective view of the molded component of FIG. 11A.
Figure 12:
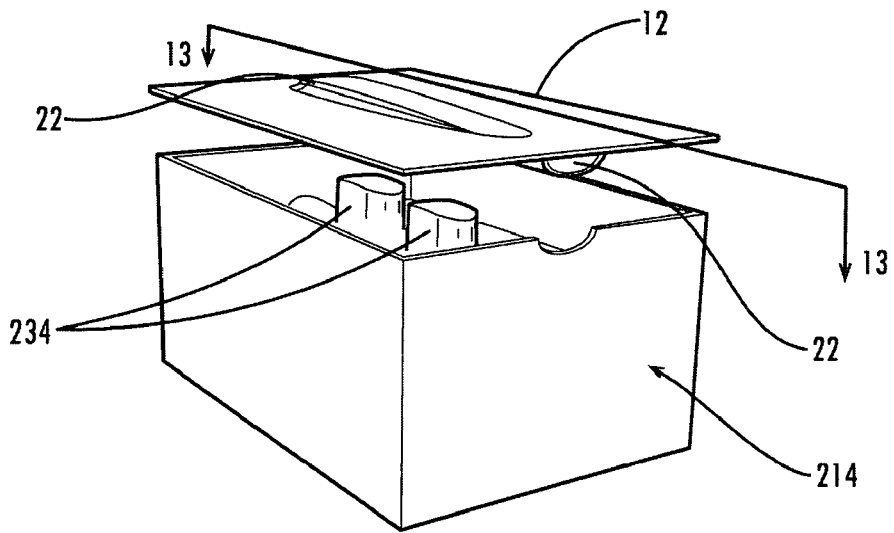
FIG. 12 shows an exploded view of a section of a mold component and shell component for molding impact liner material to a surface of the shell, according to the inventive subject matter.
Figure 13:
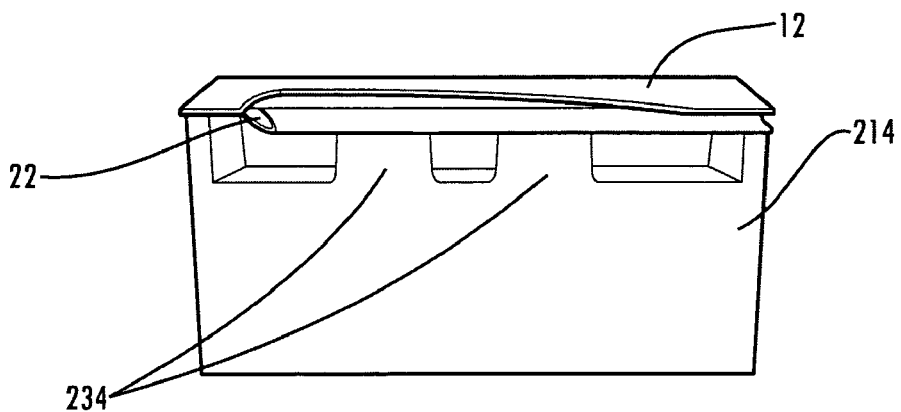
FIG. 13 shows a cross-sectional, assembled view of the components of FIG. 12 taken along line 13-13.
Figure 16A:
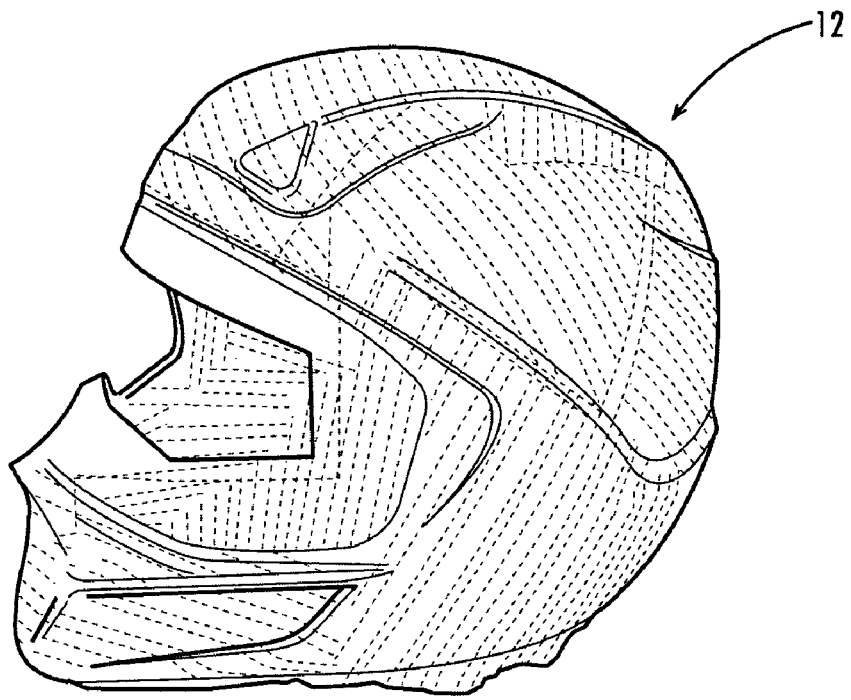
FIG. 16A shows a rough helmet shell molded according to the inventive subject matter.
Figure 16B:
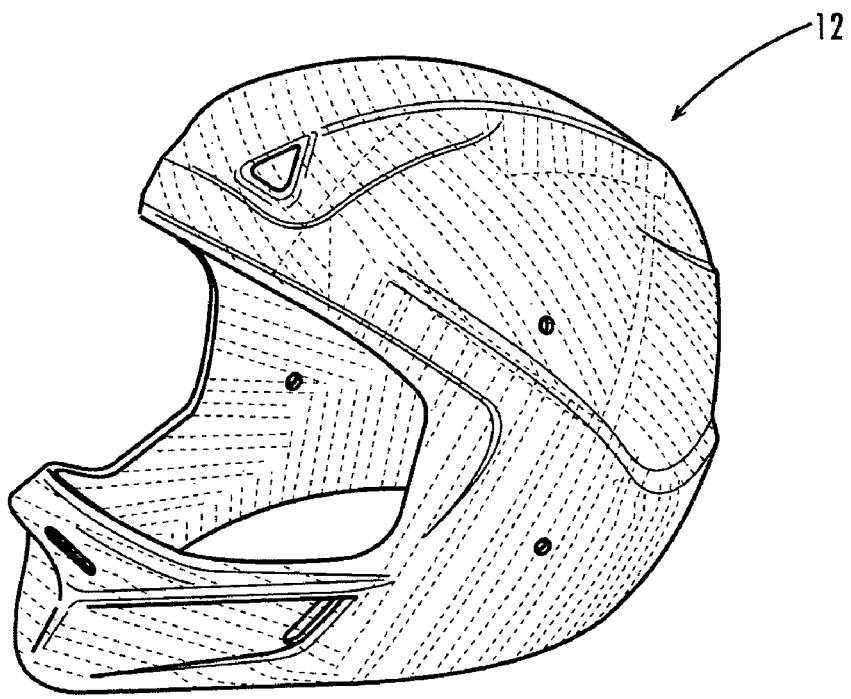
FIG. 16B shows the helmet structure of FIG. 16A after certain finishing steps.

Looking at FIGS. 7-13, a mold assembly and section of a molded component are shown. The female mold 114 is typically a tooled metal apparatus of one or more pieces. In this case the mold is formed in two halves 114A and 114B that together form a cavity that receives the inflatable bladder and laid-up composite materials. In addition to defining the outer shell's shape, the female mold is adapted to provide heat to the composite materials 14, 24 laid over the pressure bladder to activate resins and cause curing or setting of the shell materials into a finished shape. To this effect, composite lay-up and bladders are placed into the female halves 114A and 114B (FIGS. 7B, 8B, and 9). One end 112A of the tunnel bladder may be sealed off at this point, and the other end 112B may be attached to a pressurized air or other fluid source. The tool halves 114A and 114B close, and the top 115 is sealed (FIG. 7B). The tunnel bladder 124 is not compressed by the mold halves and has room to inflate. The composite material is heated up, becomes pliable, and the composite's resin is activated. Bladders 112, 124 are simultaneously inflated. The pressure from the bladder 112 pushes the composite material 14 into the tool and shape of the helmet. The pressure from the tunnel bladder 124 forms the tunnel in the composite 24 and keeps the pressure from the main bladder from collapsing the tunnel. Pressure is relieved, and the shell 12 is allowed to sit in the tool while the resin in the composite material sets and starts to cure. Once the shell is stable enough to remove (typically about 20 minutes), it is removed from the mold (FIG. 16A). The inflatable bladder 112 is removed. The air tunnel bladder 124 is pulled out and removed (or it might be trimmed to the vent opening). The shell 12 is trimmed of the excess material and cleaned up (FIG. 16B). The eye port and head opening areas are trimmed to size. Any screw holes may be drilled in. Internal vent holes in the air tunnels are not yet formed, but may be according to the process described below. FIGS. 11A and 11B, respectively show top and bottom views of a section of shell 12 with a tunnel 22 formed therein. As can be seen in FIGS. 11-12, the tunnel is a hollow tubular structure with opposing, open ends.

As used herein, "shell" is intended to encompass an untrimmed shell, a completed shell, or a partial shell that is assembled with other shell components. The term "impact liner" is intended to encompass analogous products.

After the shell is formed, and any trimming is done, it is ready for the addition of the impact liner 32. As previously noted, the impact liner is a crushable or otherwise compressible material for absorbing the force of impacts. The impact liner material may generally be any compressible, impact attenuating polymer material that is moldable and can attenuate forces sufficiently to meet common safety testing standards, such as those promulgated by the DOT and Snell Foundation. Preferably, such materials are light weight and serve other objectives noted in the Background section above. Expanded polystyrene (EPS) or polypropylene (EPP) are typically used for motorcycle helmets. Other expandable polymers that may be suitable include expanded polyurethane (EPU), polyethylene, polybutylene, polyvinyl chloride or polymethacrylamide. Co-polymers of any of the foregoing polymers, and similar polymers and co-polymers, may also be suitable as moldable, compressible, impact attenuating polymer materials. The foam may be expanded to a density typically in the range of from about 25-120 kg/m$^3$. Ultimately, the density is determined by the desired amounts of shock attenuation and helmet purpose.

EPS, as a material of choice, is used hereinafter as a representative liner material, but persons skilled in the art will appreciate how other impact liner materials may be directly formed and bonded to a motorcycle helmet shell from the teachings herein.

The direct molding of expandable polystyrene (EPS) energy-absorbing bead or other impact liner material into a shell is known in the manufacture of high-end bicycle helmets, but is believed never to have been used or suggested for manufacturing motorcycle helmets given significant differences between motorcycle helmet shells and bicycle helmet shells. U.S. Pat. No. 5,298,208 is a representative patent which discloses in-molding for a protective helmet that may be used in bicycling and some other sports, and is hereby incorporated by reference for all its teachings, as if set forth herein in its entirety.

The in-molding technique entails placing and fixing a preformed outer shell (a thin layer of thermoformed ABS or PC sheet for bicycle helmets) into an EPS mold. The tool is closed and the EPS is injected into the mold where it chemically bonds to the outer shell, creating a one-piece shell assembly. In-molding creates a very strong and lightweight shell. The inventive subject matter herein unexpectedly recognizes that despite significant differences between the nature of a motorcycle helmet outer shell (e.g., high impact resistance and fuller head and face coverage) and a bicycle helmet outer shell, in-molding for motorcycle helmets yields important advantages not previously achieved.

Referring to FIGS. 12-15B, the newly formed and trimmed shell 12 is placed into the female cavity (analogous to the female mold of FIG. 7A) of an impact liner male-female mold. In actuality, the shell's interior may be considered the female portion of the mold, and the cavity means to secure and seal the shell for molding. After the shell 12 is placed in the female mold the other side closes around. The head opening or bottom of the helmet is left open. Alternatively, the shell may be fitted into one female bowl-like mold, or might be fixtured to a vacuum shell, or otherwise setup using techniques known to persons skilled in the art.

To help impact liner material better bond to a shell, it may be advantageous to roughen or chemically prep the inner shell, using techniques known to persons skilled in the art.

A collapsible male component or inner core 214 of the mold is inserted into the head opening of the shell 12. (The collapsible core is as earlier described in connection with the molding of the shell.). A preferred collapsible core has a central piece and adjacent side pieces so that removal of the central piece first facilitates removal of the adjacent pieces. In the Figures, mold core 214, is shown as an isolated rectangular section of the full core that would be rounded to complement the interior of shell 12 and defines the shape and features of the impact liner. The edges (not shown) of core 214 come into direct contact with the inner surface of the outer composite shell, forming a seal between the shell and the tool. This will create a neat junction between the EPS and the shell, and prevents any EPS from bleeding over and blowing out of the shell. After the core portion 214 of the impact liner mold is placed into the interior of the shell, a gap is generally left between it and the shell for infill of the impact liner material during the molding process. The core 214 may be configured and spaced from the shell so that the resulting liner has a uniformly thick surface, a surface of varying thickness corresponding to shell regions providing different levels of protection, structural features, such as venting channels, and/or collapsible force attenuation structures. Typically, an impact liner has a thickness of from about 25 millimeter to about 40 millimeters. The impact absorbing properties of the impact layer also depend on the density of the foam. International Publication No. WO 2005/000059 also discloses details on molding shells and impact liners and is hereby incorporated by reference as if set forth herein in its entirety.

Impact liners according the inventive subject matter may also have zones or layers, or both, of (1) homogenous materials of different densities, and/or (2) different materials that are co-molded or assembled together. The zones or layers may be formed simultaneously in an injection molding process using molding tools with multiple injection channels or injection heads or vacuum controls for direction of materials to separate layers or zones. Alternatively, individual zones or layers could be formed in sequential molding processes. For example, a first mold core could include a male portion representing the crown portion of a helmet. A first density of EPS, for example, is injected into the mold assembly that fills the shell with foam everywhere but the crown. The mold is collapsed and a second core is assembled where the mold core has a female portion corresponding to the crown. A second injection of different density EPS customizes the impact resistance of the crown region to desired specifications.

Still further a layer or zone could be preformed and bonded (e.g., taped or glued) into a place in a shell and other layers or zones formed around to create an integral impact liner structure. Where materials are injected molded into contact with a first layer or zone that is co-molded or bonded to a shell, chemical bonds may form at the contacting surfaces, creating monolithic molded impact liner (or portion thereof).

The thickness and structural features also depend on current safety standards, such as are issued by the Snell Memorial Foundation (www.smf.org), and the US Department of Transportation (DOT). Motorcycle and other motor sport helmets can be distinguished from other kinds of protective helmets, such as bicycle helmets, based on their ability to meet such safety standards. As used herein, a motorcycle helmet (including motorcycle helmets for moto-cross) are those hard shell-impact liner helmet constructions that are capable of passing DOT Standards promulgated under the Code of Federal Regulations 49 CFR §571.218 (as existing February, 2006), which is reproduced in Appendix A attached hereto below and incorporated by reference, and also available, for example through websites such as http://www.g-poaccess.gov/.

Although the term "motorcycle helmet" is used in relation to the DOT standard, it is not intended to limit the purpose of a helmet. Protective helmets for other activities and sports may be designed to comply with the foregoing testing standard and any such helmets may also be considered a motorcycle helmet that is within the scope of the inventive subject matter disclosed herein.

One or more venting channels 34 and 36 that are coupled to one or more tunnels 24 are particularly within the scope of the inventive subject matter disclosed herein and are described in more detail below. In the context of the subject matter herein, "coupled" and its variants means that there can be fluid communication from one item to the other. For example, air from the tunnel is vented to the channel. Male parts 234 on mold core 214 correspond to vent channels 34. These parts seal against the shell's inner composite air tunnel 22. When the mold core is removed, channels are left where the male parts 134 created voids. The mold may also be configured to couple the vent channels 34, which are directly coupled to a tunnel 22, to one or more other channels 36. Channels 36 are intended to run across a wearer's head and increase the surface area of ventilation. Accordingly, a tunnel 22 directs air through at least one channel 34. The channel 34 may in turn direct air to one or more other channels 36.

Figure 14:
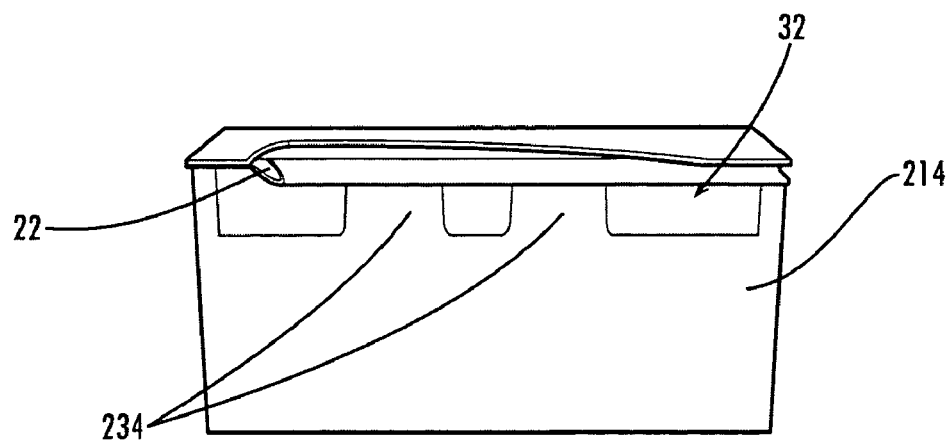
FIG. 14 shows the assembly of FIG. 13 with mold material.
Figure 15A:
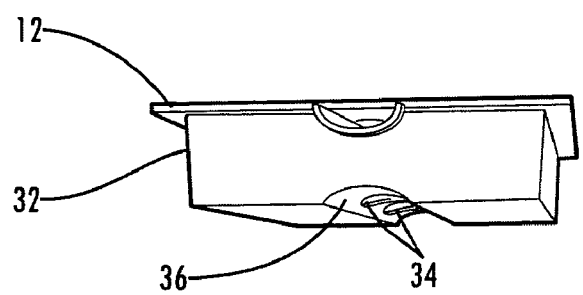
FIG. 15A shows a side perspective view of a molded component according to a molding process using the assembly of FIG. 14.
Figure 15B:
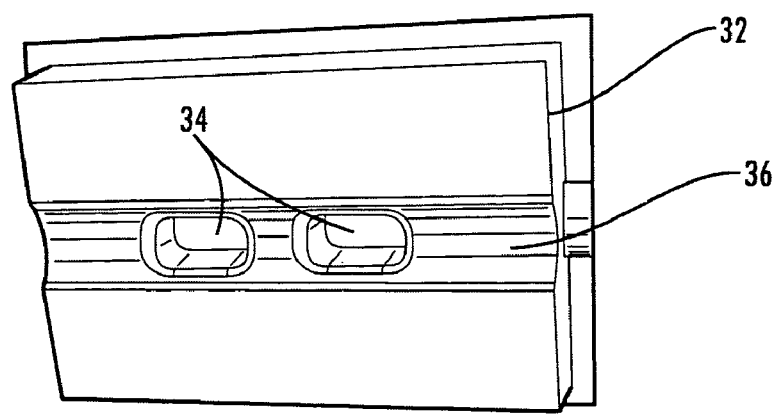
FIG. 15B shows a bottom view of the molded component of FIG. 15A.

Any EPS plastic inserts may be added to the tool at this time (for example, comfort liner snaps, visor pivots, etc.). EPS beads are injected into the shell and tool at the proper pressure and heat. The beads chemically adhere to the inner surface of the outer composite shell (FIG. 14). Proper time is allowed for the EPS to inflate and cure.

The inner collapsible core is removed, the middle part pulls out slightly, the two sides slide closer together and then the whole core lifts out of the head opening. The finished shell (FIGS. 15A-B), now co-molded with the impact liner, is removed from the tool.

The completed helmet shell may be carefully weighed to discover any air voids in the EPS that might not be visible under the outer shell. Any excess EPS flash is trimmed.

The helmet may be fixtured to a trimming mandril and all final trimming is performed. The vent holes for the air tunnels on the inside of the helmet may be trimmed out to provide coupling to channels 34. Any final cleaning and trimming is done on the shell. EPS shell may be masked to prevent paint and clear-coat from contaminating it. The mask can be re-usable.

The shell may then go through normal assembly procedures, such as application of primer, sanding, and painting. Graphic decals may be applied over a base coat and clear coat applied over that. EPS interior fabric may be glued on. The chin bar may be attached if not already co-molded. Base/eyeport trims may be glued on. Extraneous items are attached, such as mouthpiece, vents, comfort liners, cheekpads, visors, straps, etc.

The helmet tunnel venting system can also be tuned to achieve Venturi effects by selectively locating constrictions in tunnels that will provide low pressure zones that will pull air from across a wearer's head. To accomplish this, the low pressure zone of a tunnel may be coupled via a tube or similar structure to the cavity of a helmet so that air is pulled through the cavity and across a user's head and into the low pressure zone of the constriction. The low pressure portion of the tunnel may then vent air out of the helmet.

While the inventive subject matter disclosed may be used to construct all types of protective helmets for all types of activities, particularly those that satisfy the DOT standard identified above, it may also be used to construct other molded structures. For example, elbow, knee, thigh, shin, hand, or foot guards. Aside from wearable protective equipment, it may also be used to create ventilated panel-like structures that are impact resistant for use in motor- or human-powered vehicles.

As used herein, the term "comprise" and its variants, in keeping with longstanding patent parlance, is an open-ended teem akin to "include".

All non-patent and patent literature cited in this application is hereby incorporated by reference for all purposes as if cited in their entirety.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed:

1. A shell for a protective helmet comprising:
   an outer shell and a tunnel element integral to the outer shell, the tunnel element having a first opening at an outer surface side of the shell and a second opening at an inner surface side of the shell so that air flow may occur between the openings;
   an interface of resinated composite lay-up materials that integrates the tunnel element and the outer shell together; and
   wherein the tunnel element comprises a hollow tubular structure running generally longitudinally from a front portion to at least a middle portion of the helmet, so that the tunnel element provides an air tunnel positioned substantially within and integral with the outer shell.

2. The shell of claim 1 wherein the tunnel has a molded inner wall in a unitary structure with the outer shell.

3. The shell of claim 1 wherein the tunnel is a preformed tunnel element that is chemically bonded to a portion of the shell.

4. The shell of claim 2 wherein the shell comprises a molded lay-up of composite material.

5. The shell of claim 4 wherein at least some of the composite materials include prepreg materials.

6. The shell of claim 5 further comprising an impact liner disposed in the interior of the shell.

7. The shell of claim 1 further comprising an impact liner disposed in the interior of the shell.

8. The shell of claim 7 wherein the impact liner comprises a moldable, compressible, impact attenuating polymer material.

9. The shell of claim 8 wherein the impact liner and shell are chemically bonded creating a one-piece shell assembly.

10. The shell of claim 8 wherein the tunnel is coupled to at least one channel formed in the impact liner.

11. The shell of claim 1 wherein the shell comprises a molded composite lay-up.

12. The shell of claim 1 wherein the tunnel comprises a molded composite lay-up.

13. The shell of claim 9 wherein the impact liner comprises EPS or EPP.

14. The shell of claim 9 further comprising an impact absorbing liner that is connected to the shell and into which the tubular element extends.

15. The shell of claim 1 further comprising an impact liner comprising multiple layers or zones of different densities of moldable, compressible impact attenuating polymer material.

16. The shell of claim 5 further comprising an impact liner comprising multiple layers or zones of different densities of moldable, compressible impact attenuating polymer material.

17. The shell of claim 1 wherein the shell comprises at least one of carbon fiber, aramid fiber, fiberglass, polycarbonate, and ABS.

18. The shell of claim 17 wherein the tunnel material comprises at least one of carbon fiber, aramid fiber, fiberglass, polycarbonate, and ABS.

19. The shell of claim 18 wherein the tunnel has a volume of at least approximately 1.0 cubic inch.

20. The shell of claim 17 wherein an impact liner comprising a moldable, compressible impact attenuating polymer material is in-molded directly to at least a portion of the tunnel.

21. A helmet comprising the shell and impact liner of claim 20, wherein the helmet meets US DOT Standard 218.

22. A shell according to claim 1 wherein the tunnel includes a constriction for providing a Venturi effect.

23. The shell of claim 1 wherein the tunnel is a preformed tunnel element comprising a resinated composite lay-up of materials.

24. The shell of claim 1 wherein the shell comprises a resinated lay-up of composite materials.

* * * * *